United States Patent [19]

Steckhan

[11] Patent Number: 5,808,680
[45] Date of Patent: Sep. 15, 1998

[54] METHOD OF TRANSMITTING VIDEO SIGNALS, AND PICTURE-TRANSMISSION SYSTEM FOR FIELD-OF-OPERATION ILLUMINATING FIXTURES

[75] Inventor: Markus Steckhan, Oberursel, Germany

[73] Assignee: Heraeus Med GmbH, Hanau, Germany

[21] Appl. No.: 603,628

[22] Filed: Feb. 20, 1996

[30] Foreign Application Priority Data

Apr. 7, 1995 [DE] Germany .......................... 195 12 692.0
Jun. 30, 1995 [DE] Germany .......................... 195 23 377.8

[51] Int. Cl.⁶ ..................................................... H04N 5/225
[52] U.S. Cl. ............................ 348/370; 348/373; 362/804
[58] Field of Search .............................. 348/370, 77, 375, 348/373; 362/804, 3, 249

[56] References Cited

U.S. PATENT DOCUMENTS 3,891,842  6/1975  Strusinski .................................. 348/77
5,450,140  9/1995  Washino .................................. 348/552

FOREIGN PATENT DOCUMENTS 0 421 130  4/1991  European Pat. Off. .
88 14 303  2/1989  Germany .
GM 89 13 757  5/1991  Germany .
92 17 573  8/1993  Germany .
93 06 771  8/1993  Germany .

*Primary Examiner*—Wendy Garber
*Attorney, Agent, or Firm*—Frishauf, Holtz, Goodman, Langer & Chick, P.C.

[57] ABSTRACT

A field-of-operation illuminating fixture with a video camera in the vicinity of a lamp housing for displaying the field. The video signals emitted by the camera are forwarded along with signals for controlling the camera over the same cable that transmits power to the lamps. The cable extends through the mechanism that the housing is suspended from, such as being extended from a ceiling. The cable is in sections connected by rotating contacts in the form of slip rings at the articulations between a suspension boom and arms. Video signals and camera-control signals are modulated before entering the cable by a module in the ceiling-mounted base of the fixture and are demodulated in another module after leaving the cable. The video signals are processed in a separate accessory. The present invention provides a cost-effective design for a field-of-operation illuminating fixture equipped for video and simple modification of fixtures already equipped therewith.

18 Claims, 2 Drawing Sheets

METHOD OF TRANSMITTING VIDEO SIGNALS, AND PICTURE-TRANSMISSION SYSTEM FOR FIELD-OF-OPERATION ILLUMINATING FIXTURES

BACKGROUND OF THE INVENTION

1. Field of the Invention

The present invention concerns a method of transmitting video signals obtained by a video camera associated with a field-of-operation illuminating fixture and forwarded through at least one electric cable extending through the mechanism that the fixture is suspended from the ceiling. The present invention also concerns a system of transmitting pictures through a field-of-operation illuminating fixture associated with a video camera.

2. Background Information

A picture-transmission system associated with field-of-operation illuminating fixtures is known from German GM 89 13 757. A video camera is accommodated in the fixture. Video signals and camera-control signals are transmitted by cables accommodated in the suspension mechanism and by way of slip rings at the articulations between the boom and arms of the mechanism Each slip ring can have 6 to 12 electrical contacts per articulation.

The comparatively complex circuitry with all its cables and slip rings inside the articulations and the difficulty of installing a video camera and picture-transmission system in it, later constitutes drawbacks.

SUMMARY OF THE INVENTION

One object of the present invention is to provide a method of and a system for transmitting video signals and control signals with a minimum of cables and slip rings or cable-to-cable connectors. The present invention will also facilitate installation of picture-transmission systems in conventional field-of-operation illuminating fixtures.

The present invention allows for adapting the various cables so that the driver can be connected and disconnected in relation to one application of the power-supply circuitry conventional for field-of-operation illuminating fixtures and their connectors, without perceptible detriment to the video signals that dictate picture quality.

The present invention also affords that the video and camera-control signals can be transmitted over the conventional cables, which are at any rate already designed for use in field-of-operation illuminating fixtures with currents of 17 to 20 amperes, without serious problems and without interfering with the operation of the lamps or camera.

By utilizing the present invention, the same coaxial cable can be used to provide power to the lamps and camera and to transmit both video and control pulses. The camera can in this event be fully integrated into the field-of-operation illuminating fixture. It is, on the other hand, also possible for the camera to be attachable, as is conventional when using an existing fixture.

One essential advantage of adding the video system later is that both camera-control signals and video signals can be transmitted through connectors at the articulations over the line conventionally employed to provide power to the lamps. Even when the characteristics of a conventional line are not ideal for transmitting video and camera-control signals, it is still possible to transmit them over it without perceptible sacrifice and without complex regeneration.

The present invention is directed to a method of transmitting video signals obtained by a video camera associated with a field-of-operation illuminating fixture having at least one lamp and transmitted through at least one electric cable extending through a suspension mechanism that the fixture is suspended from, for example, suspended from a ceiling, wherein camera-control signals are transmitted through the cable along with video signals, whereby the cable also supplies power to the lamp or lamps in the illuminating fixture and to the video camera.

The present invention is also directed to a system for transmitting pictures through a field-of-operation illuminating fixture associated with a video camera, comprising:

a field-of-operating illuminating fixture, including a stationary base having a first coupling module, the first coupling module having electrical connections for a power supply and for video camera controls;

a housing having a second coupling module, the second coupling module including electrical connections for the video camera, and at least one lamp;

a suspension mechanism suspending the housing from the stationary base, the suspension mechanism containing a boom connected via articulations to arms, the suspension mechanism having rotating contacts;

a cable that extends from the first coupling module in the stationary base through the second coupling module in the housing of the illuminating fixture and through the suspension mechanism, the cable transmitting both video signals and camera-control signals, wherein the rotating contacts of the suspension mechanism electrically connect sections of the cable at the articulations between the boom and the arms of the suspension mechanism, and wherein the cable simultaneously transmits power for operating the at least one lamp, video signals, and signals for controlling the video camera.

BRIEF DESCRIPTION OF THE DRAWINGS

For the purposes of illustrating the invention, there is shown in the drawings forms which are presently preferred. It is to be understood, however, that the present invention is not limited to the precise arrangements and instrumentalities depicted in the drawings.

DETAILED DESCRIPTION OF THE INVENTION

Figure 1:
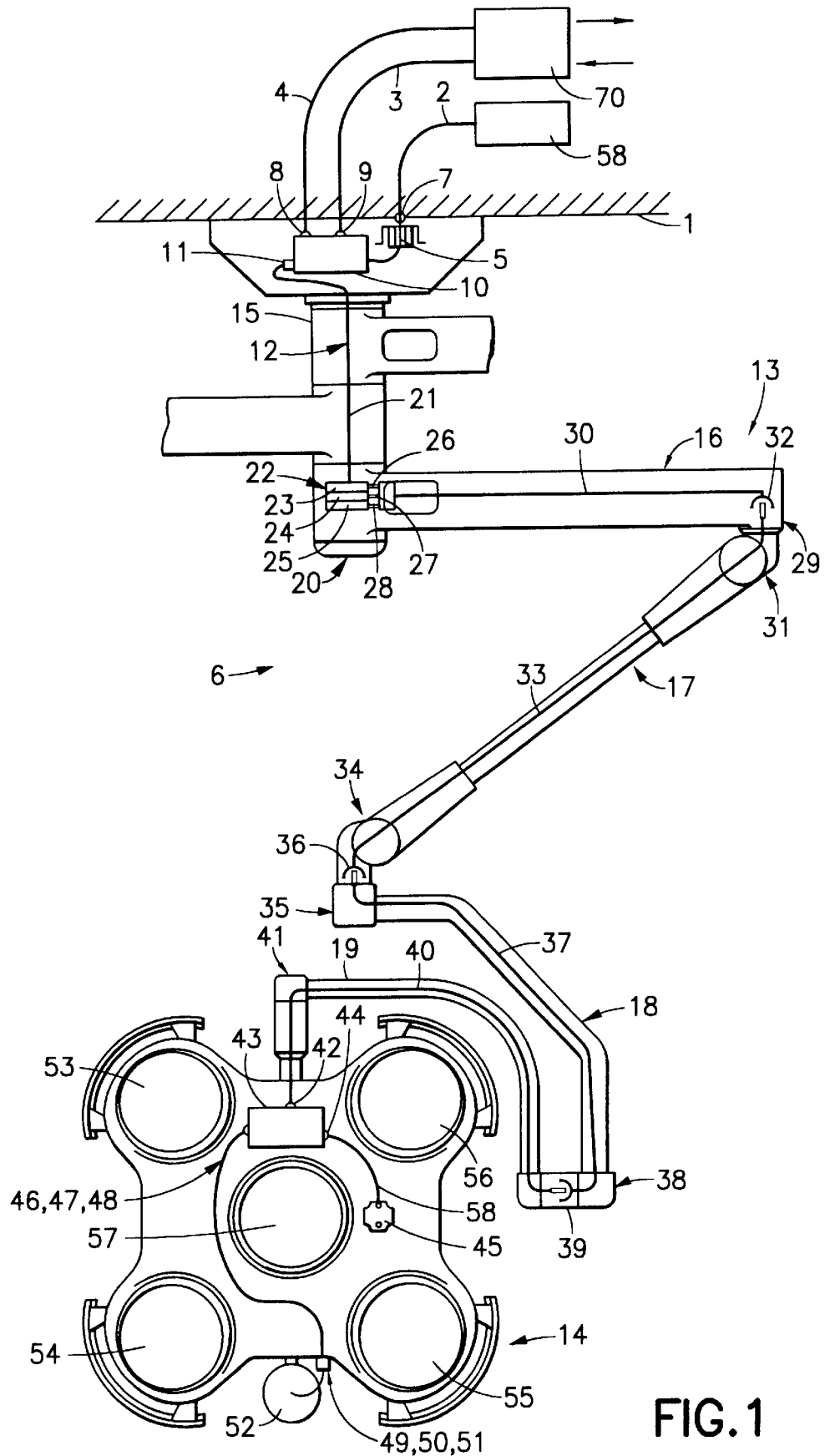
FIG. 1 is a schematic longitudinal section taken through a field-of-operation illuminating fixture suspended from the ceiling of an operating room and with a video-transmission system integrated into it.

The field-of-operation illuminating fixture 6 illustrated in FIG. 1 comprises a lamp housing 14 suspended at the end of a suspension mechanism 13 from a base 5 mounted against the ceiling 1 of an operating room. Mechanism 13 itself comprises a flanged cylinder 15, a boom 16, a spring-loaded straight upper arm 17, a bent lower arm 18, and a curved lower arm 19. A power-supply cable 2, a camera-control cable 3, and a video-signal cable 4 are accommodated in ceiling 1 and connected to terminals 7, 8 and 9 accommodated on a first coupling module 10 inside ceiling-mounted base 5. The first coupling module 10 is connected by an electrical connection 11 to a flat twin-core cable 12 that extends through mechanism 13.

The first section 21 of cable 12 extends from an electrical terminal 11 accommodated on the first coupling module 10 and through flanged cylinder 15, to a first electrical contact 22 accommodated at a first horizontal articulation 20. The first electrical contact 22 transmits power and signals from the first section 21 to the second section 30 of cable 12 through slip rings 23, 24 and 25, which are accommodated stationary in flanged cylinder 15, and through rotating electrical contacts 26, 27 and 28. The triple-ring contact system transmits a protective potential, ensuring safety as boom 16 rotates 360° or more. The second section 30 of cable 12, accommodated in boom 16, is connected by way of a second electrical contact 32, accommodated in a second horizontal articulation 29, to the third section 33 of cable 12, accommodated inside the straight upper arm 17. The straight upper arm 17 rotates 360° around the second horizontal articulation 29, and 86°±43° around a vertical articulation 31. At its other end, the straight upper arm 17 rotates around a second vertical articulation 34 and around a third horizontal articulation 35. Between the second vertical articulation 34 and the second horizontal articulation 35 is a third electrical contact 36. The third electrical contact 36 connects the third section 33 of cable 12 to its fourth section 37. The fourth section 37 is accommodated in a bent lower arm 18. The bent lower arm 18 rotates at its upper end around the second horizontal articulation 35 and at it lower end around a third vertical articulation 38. The third vertical articulation 38 accommodates a fourth electrical contact 39. The fourth electrical contact 39 connects the fourth section 37 of cable 12 to its fifth section 40. The fourth electrical contact 39 rotates around a horizontal axis. The curved lower arm 19 rotates at one end around an articulation 41. The housing 14 of the field-of-operation illuminating fixture rotates around the articulation 41. The cable 12 is connected at its other end by way of an electrical connection 42 to a second coupling module 43 accommodated inside housing 14. The second coupling module 43 has four terminals 44, 47, 48 and 49. The second coupling module 43 is connected by way of terminal 44 and another line 58 to a terminal block 45. The terminal block 45 supplies power to the individual lamps. The second coupling module 43 is also connected to a power-supply input terminal 46 by way of terminal 49, to a camera-control signal input terminal 50 by way of terminal 47, and to the video-signal output terminal 51 of camera 52 by way of terminal 48. The camera 52 in the illustrated embodiment is mounted on the side of housing 14 where it can be directed at the illuminated field of operation. The field-of-operation illuminating fixture also accommodates lamps 53, 54, 55, 56 and 57.

The cable 12 is a conventional flat power-supply line with twin cores of the type usually employed with field-of-operation illuminating fixtures. The contacts employed to transmit a protective potential are three-poled. Each comprises three slip rings and sliding contacts. It is, on the other hand, also possible to employ for both power supply and signal transmission a coaxial cable with its sections connected by contacts that will allow signal transmission without outside interference.

Figure 2:
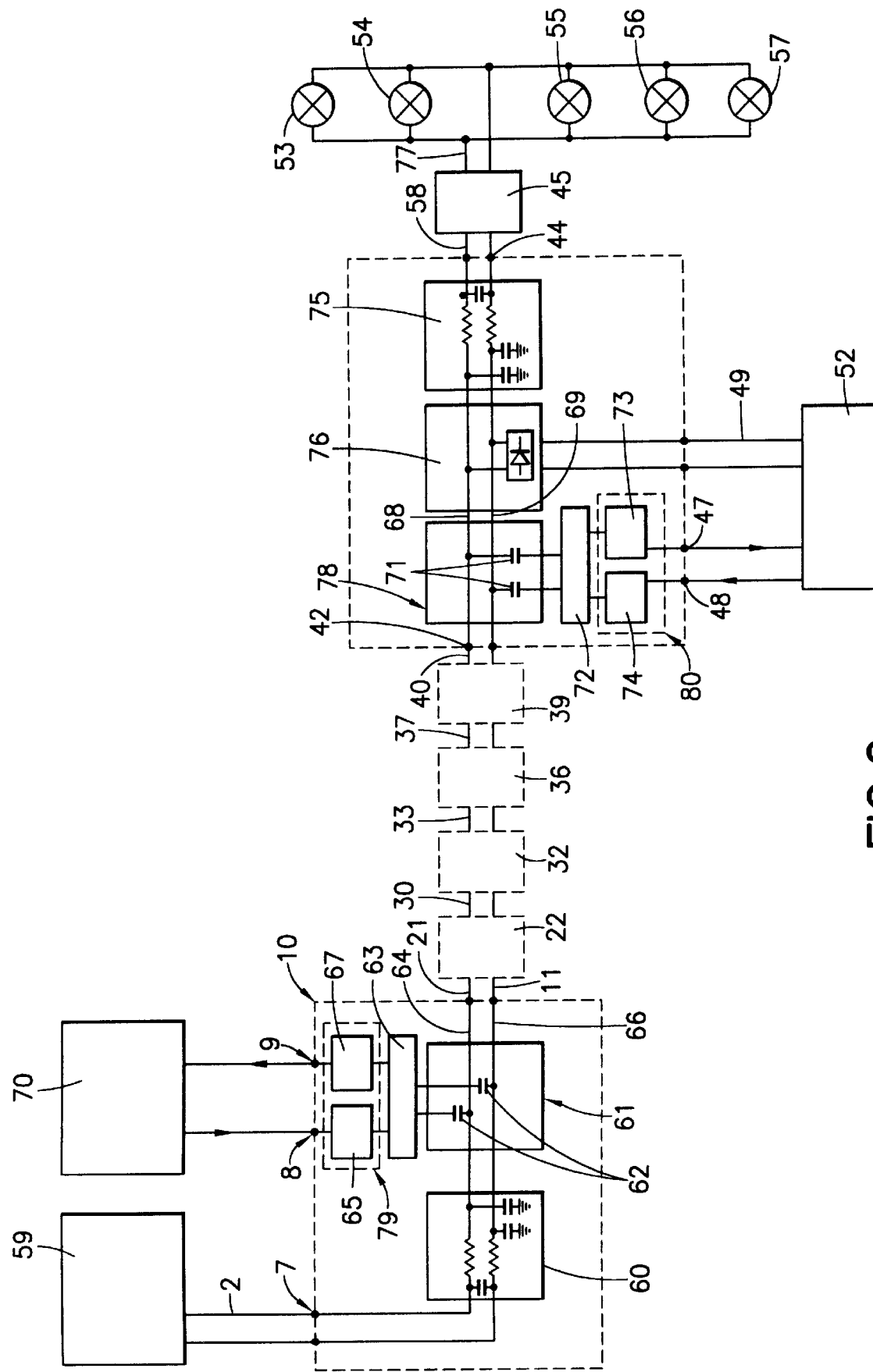
FIG. 2 is a schematic block diagram of the circuitry that transmits the camera-control signals, the video signals, and the power.

Power-supply system 59 and video accessory 70 will now be specified with reference to FIG. 2.

The block diagram in FIG. 2 illustrates the circuitry and the internal design of the coupling modules and peripherals.

The power-supply cable 2 is connected to a terminal 7 accommodated in the first coupling module 10 and to the power-supply system 59. The power-supply system 59 incorporates a transformer. The transformer is connected to the electrical mains. The secondary end of the transformer supplies power-supply cable 2 with an alternating current at 24 V and 50 Hz, for example. Power-supply system 59 also includes an emergency power-supply section (not shown). The emergency power-supply section contains rechargeable batteries. The batteries can be recharged by a recharger supplied with power from the mains. The emergency section supplies direct current at approximately 24 volts to power-supply cable 2 in the event of a power outage. Power-supply terminal 7 is connected inside the first coupling module 10 to a mains filter 60. The mains filter 60 suppresses interference in the form of voltage peaks and harmonics and ensures a smooth transmission of video and camera-control signals. The mains filter 60 is galvanically connected by way of line 64 and 66 accommodated in a signal coupling-and-uncoupling stage 61 to the connection 11 that leads to cable 12.

Signal coupling-and-uncoupling stage 61 includes coupling capacitors 62 that couple power-supply lines 64 and 66 to the modulating section 79. The modulating section 79 includes a modulator 65 and a demodulator 67. Between the modulating section 79 and the signal coupling-and-uncoupling stage 61 is a matching stage 63 that prevents false matches. It is accordingly possible to modulate the camera-control signals or optionally synchronization signals present at the input terminal 8 accommodated in the first coupling module 10 over the power-supply lines 64 and 66 while video signals are emitted by the camera over power-supply line 64 and 66 and demodulator 67 from a video-signal output terminal 9 accommodated in the first coupling module 10 for further image processing in the video accessory 70. The power-supply lines 64 and 66 comprises the twin conductors that constitute cable 12, which is connected by way of connection 11. It is in practice possible for cable 12 to be a flat twin-core line, although it can also be a coaxial cable. Safety regulations dictate a third conductor, electrically connected to the housing of the field-of-operation illuminating fixture and the suspension mechanism. The third conductor is, for simplicity sake, not shown in the drawing.

The cable 12 will for simplicity sake be considered a twin-core conductor in the following. Sections 21, 30, 33, 37 and 40 of cable 12 are connected by contacts, 22, 32, 36 and 39. The first section 21 is connected by terminal 11 and the fifth section 40 by the terminal 42 to the second coupling module 43 accommodated in the housing 14.

The two contacts in the connection 42 accommodated in the second coupling module 43 are connected to lines 68 and 69. Lines 68 and 69 lead by way of a signal coupling-and-uncoupling section in the form of coupling capacitors 71 to a demodulator 73 in a modulating section 80 for the purpose of demodulating the signals 50 that control the camera 52. The video signals generated by the camera 52 are modulated onto lines 68 and 69, by way of a matching section 72 and the coupling capacitors 71 accommodated in a modulator 78, and transmitted over the cable 12. Lines 68 and 69 are also connected to a power-supply component 76 that supplies power to the power-input terminal 46 of the camera 52. The power-supply component 76 converts the alternating current obtained from the mains during normal operation into direct current and adapts the direct current obtained from the battery during a power outage so that it can be handled by the camera. A mains filter 75 supplies current to the terminal block 45 connected to the lamps 53, 54, 55, 56 and 57.

In normal mains operation accordingly, lamps 53, 54, 551 56 and 57 are supplied with power from the power-supply system 59 by way of the power-supply cable 2, the first coupling module 10, the terminal 11, the cable 12, the terminal block 45, and the lamp-supply lines 77. Camera-control signals (alignment signals and synchronization signals) are simultaneously emitted by way of the video accessory 70 and the camera-control input terminal 8 to the modulator 65 accommodated in the first modulating section 79 of the first coupling module 10 and modulated by way of the matching stage 63 and the coupling capacitors 62 onto the power-supply lines 64 and 66 or the cable 12 with their intermediate contacts until they arrive by way of the connection 42 and lines 68 and 69, the coupling capacitors 71, and the matching section 72 of the second coupling module 43 in the demodulator 73 in the modulating section 80 and hence by way of the connection (terminal) 47 in the form of control signals or synchronization signals at the signal input terminal 50 of the camera 52. The video signals obtained from camera 52 are forwarded by way of video-signal output terminal 51 and the connection (terminal) 48 to the modulator 74 of the modulating section 80, and modulated by way of the matching section 72 and the coupling capacitors 71 onto lines 68 and 69 and onto cable 12 by way of the terminal (connection) 42. The video signals are then forwarded by way of the sections of cable 12 and the electrical contacts 39, 36, 32 and 22 to the terminal 11 to the first coupling module 10.

The video signals received in the module 10 are forwarded by way of the coupling capacitors 62 and the matching stage 63 to the demodulator 67 in the modulating section 79 and in the form of picture signals by way of video-signal output terminal 9 to video accessory 70, wherein they are available for picture processing. The mains filters 60 and 75 in the first coupling module 10 and the second coupling module 43 will keep any distorting high-frequency signals away from the power-supply system 59 and the picture-transmission system.

Power is supplied to the lamps 53, 54, 55, 56 and 57 in the event of a power failure by way of a battery-backed direct current processed into a current that the camera 52 can use in the second coupling module 43.

It will be appreciated that the instant specification is set forth by way of illustration and not limitation, and that various modifications and changes may be made without departing from the spirit and scope of the present invention.

I claim:

1. A method of transmitting video signals obtained by a video camera associated with a field-of-operation illuminating fixture having at least one lamp, comprising:

transmitting the video signals through one electric cable extending through a suspension mechanism that the fixture is suspended from;

transmitting camera-control signals through the electric cable along with the video signals; and supplying power to the at least one lamp in the illuminating fixture and to the camera by the electric cable, wherein the video signals are modulated onto the at least one electric cable by a first modulator disposed downstream of the camera and demodulated again into video signals once the signals have traveled through the suspension mechanism.

2. The method as in claim 1, wherein the camera-control signals are modulated onto the at least one electric cable by a second modulator disposed downstream of a camera control-signal input terminal and demodulated into camera-control signals again by a demodulator disposed upstream of the camera once the signals have traveled through the suspension mechanism.

3. The method as in claim 1, wherein the camera-control signals are modulated onto the at least one electric cable by a second modulator disposed downstream of a camera control-signal input terminal and demodulated into camera-control signals again by a demodulator disposed upstream of the camera once the signals have traveled through the suspension mechanism.

4. A system for transmitting pictures through a field-of-operation illuminating fixture associated with a video camera, comprising:

a field-of-operating illuminating fixture including a stationary base, having a first coupling module, the first coupling module having electrical connections for a power supply and for video camera controls, wherein the first coupling module is accommodated in the stationary base along with an accessory that emits video signals for displaying pictures and intercepts signals for controlling the camera and with an electrical connection for a power supply system that supplies power for the lamps;

a housing having a second coupling module, the second coupling module including electrical connections for the video camera, and at least one lamp, wherein the second coupling module is accommodated in the housing alone with the camera and a terminal block for the at least one lamp;

a suspension mechanism suspending the housing from the stationary base, the suspension mechanism containing a boom connected via articulations to arms, the suspension mechanism having rotating contacts;

a cable extending from the first coupling module in the stationary base through the second coupling module in the housing of the illuminating fixture and through the suspension mechanism, the cable transmitting both video signals and camera control signals, wherein the rotating contacts in the suspension mechanism electrically connect sections of the cable at the articulations between the boom and the arms of the suspension mechanism, and wherein the cable simultaneously transmits power for operating the at least one lamp, video signals, and signals for controlling the video camera.

5. The system as in claim 4, wherein the first coupling module has a first terminal for supplying power, a second terminal for inputting camera-control signals, and a third terminal for outputting video signals; and the second coupling module has a first terminal for supplying power to the camera, a second terminal and a line for supplying power to each of four lamps, a third terminal for outputting camera-control signals, and a fourth terminal for inputting video signals.

6. The system as in claim 5, wherein the first coupling module has a first terminal for supplying power, a second terminal for inputting camera-control signals, and a third terminal for outputting video signals; and the second coupling module has a first terminal for supplying power to the camera, a second terminal and a line for supplying power to each of four lamps, a third terminal for outputting camera-control signals, and a fourth terminal for inputting video signals.

7. The system as in claim 4, wherein the first coupling module accommodates a modulator for modulating camera-control signals onto the cable and a demodulator for demodulating the transmitted video signals; and the second coupling module accommodates a demodulator for demodulating the transmitted camera-control signals and a modulator for modulating the video signals emitted from the camera.

8. The system as in claim 4, wherein the first coupling module accommodates a modulator for modulating camera-control signals onto the cable and a demodulator for demodulating the transmitted video signals; and the second coupling module accommodates a demodulator for demodulating the transmitted camera-control signals and a modulator for modulating the video signals emitted from the camera.

9. The system as in claim 5, wherein the first coupling module accommodates a modulator for modulating camera-control signals onto the cable and a demodulator for demodulating the transmitted video signals; and the second coupling module accommodates a demodulator for demodulating the transmitted camera-control signals and a modulator for modulating the video signals emitted from the camera.

10. The system as in claim 6, wherein the first coupling module accommodates a modulator for modulating camera-control signals onto the cable and a demodulator for demodulating the transmitted video signals; and the second coupling module accommodates a demodulator for demodulating the transmitted camera-control signals and a modulator for modulating the video signals emitted from the camera.

11. The system as in claim 4, wherein the first coupling module includes at least one matching stage between a modulating section, comprising a first modulator and a demodulator, and a first power-supply line; and the second coupling module includes at least one matching section between a modulating section, comprising a second modulator and a demodulator, and a second power-supply line.

12. The system as in claim 4, wherein the first coupling module includes at least one matching stage between a modulating section, comprising a first modulator and a demodulator, and a first power-supply line; and the second coupling module includes at least one matching section between a modulating section, comprising a second modulator and a demodulator, and a second power-supply line.

13. The system as in claim 5, wherein the first coupling module includes at least one matching stage between a modulating section, comprising a first modulator and a demodulator, and a first power-supply line; and the second coupling module includes at least one matching section between a modulating section, comprising a second modulator and a demodulator, and a second power-supply line.

14. The system as in claim 6, wherein the first coupling module includes at least one matching stage between a modulating section, comprising a first modulator and a demodulator, and a first power-supply line; and the second coupling module includes at least one matching section between a modulating section, comprising a second modulator and a demodulator, and a second power-supply line.

15. The system as in claim 4, wherein the cable is a flat twin-core cable.

16. The system as in claim 4, wherein the cable is a coaxial cable.

17. The system as in claim 15, wherein the cable is in sections connected by a plurality of rotating contacts.

18. The system as in claim 16, wherein the cable is in sections connected by a plurality of rotating contacts.

* * * * *

UNITED STATES PATENT AND TRADEMARK OFFICE
CERTIFICATE OF CORRECTION

PATENT NO. : 5,808,680
DATED : September 15, 1998
INVENTOR(S) : STECKHAN

It is certified that error appears in the above-identified patent and that said Letters Patent is hereby corrected as shown below:

Column 6, lines 66 and 67, and Column 7, lines 1-6
(Claim 8): delete in entirety.

Column 7, lines 30 and 31, and Column 8, lines 1-5
(Claim 12): delete in entirety.

Signed and Sealed this

Eleventh Day of July, 2000

*Attest:*

Q. TODD DICKINSON

*Attesting Officer*         *Director of Patents and Trademarks*